(No Model.)
M. HONIGMANN.
STORING POWER BY STEAM UNDER PRESSURE.
No. 324,696. Patented Aug. 18, 1885.
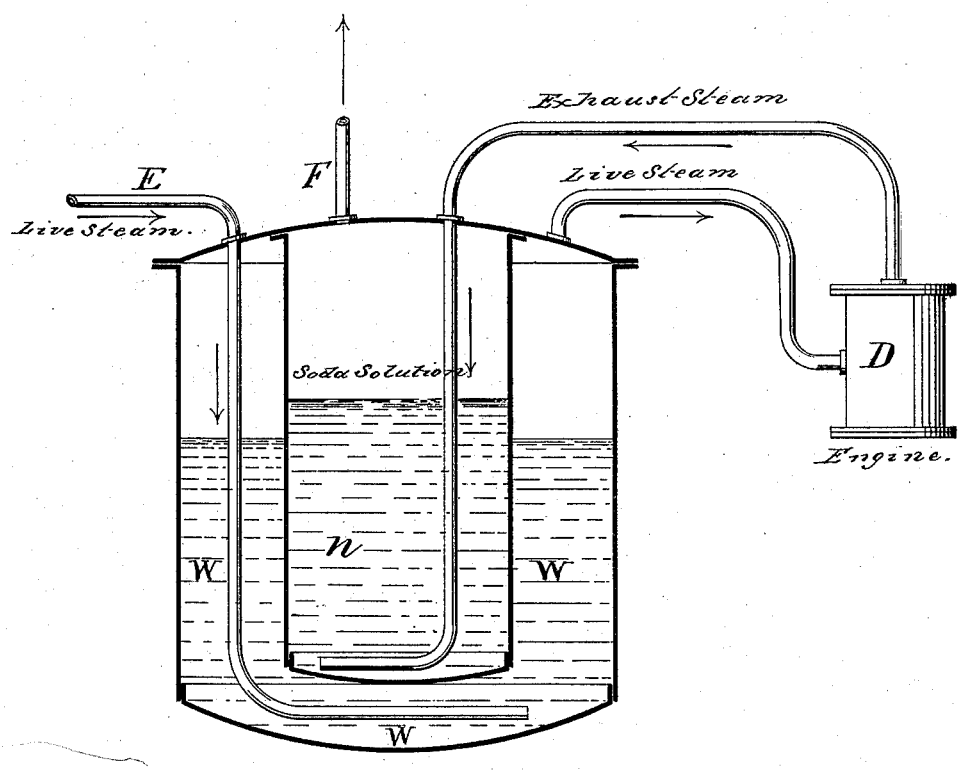
Witnesses:
Matthew Pollock
Minert Linderman
Inventor
Moritz Honigmann
by his Attys
Brown & Hall

UNITED STATES PATENT OFFICE.

MORITZ HONIGMANN, OF GREVENBERG, NEAR AIX-LA-CHAPELLE, GERMANY.

STORING POWER BY STEAM UNDER PRESSURE.

SPECIFICATION forming part of Letters Patent No. 324,696, dated August 18, 1885.

Application filed May 18, 1885. (No model.)

*To all whom it may concern:*

Be it known that I, MORITZ HONIGMANN, a citizen of Germany, and residing at Grevenberg, near Aix-la-Chapelle, Germany, have invented new and useful Improvements in Storing Power by Steam under Pressure, of which the following is a specification.

This invention relates to the process or method of utilizing exhaust-steam for the generation of steam under pressure which is the subject of my United States Letters Patent, No. 287,937, dated November 6, 1883, and which consists in effecting the absorption of such steam by a salt—such as caustic soda or potash—whose solution has a higher boiling point than water, and the employment of the heat caused by this absorption for the evaporation of the water from which the steam under pressure is to be generated.

In an apparatus for carrying out that process there are two vessels, one of which contains the aforesaid solution, and the other, being the boiler proper, contains the water which is to be evaporated by the heat caused in the said solution by the absorption of the exhaust-steam, and there is an engine which receives its steam from the water-vessel above mentioned, and which exhausts its steam into said solution. As the operation of the engine proceeds the solution into which the steam is exhausted becomes in time so diluted that it can no longer be used and the said solution has to be concentrated.

The present invention consists, essentially, in a method of providing for this concentration without drawing off the solution from the vessel in which it is used, and will now be described with reference to the accompanying drawing, which is an elevation, mainly in section, of a fireless engine and its appurtenances.

W is the water evaporating or boiling vessel, having arranged within it the vessel $n$, containing the caustic solution. D is the steam-engine, receiving steam from the water-vessel or boiler W and exhausting into the solution in the vessel D. E is a pipe for introducing into the water in the vessel or boiler W steam under pressure from any steam-boiler suitably located.

When, after the working of the engine for a certain time, the solution in the vessel $n$ has become diluted to a certain degree by the exhaust-steam from the engine, the pipe E is put into communication with the steam-boiler from which the steam is to be taken to the vessel or boiler W, and steam under pressure is injected into the water in the latter vessel or boiler, whereby the said steam becomes condensed, and the heat given out is transmitted to the solution in the vessel $n$ through the walls of the latter. The vapor thus evolved from the solution is allowed to escape into the atmosphere through the pipe F in the top of the vessel $n$ until the boiling-point of the said solution is nearly equal to the temperature of the steam under pressure blown into the boiler W.

The process which is the subject of this invention differs from that performed by the invention which is the subject of my other application for United States Letters Patent, Serial No. 166,984, filed May 20, 1885, in that, according to this invention, the reconcentration of the steam-absorbing solution is effected by raising its temperature, while according to that which is the subject of my said other application such reconcentration is effected by mechanical exhaustion produced by a pump.

What I claim as my invention is—

The within-described improvement in the art of obtaining power from exhaust-steam by producing its absorption into a solution which has a high boiling-point and utilizing the heat caused by such absorption for generating steam in a water-vessel apart from the vessel in which such absorption is produced, said improvement consisting in the injection of steam under pressure into said water-vessel for the purpose of heating the water therein, and thereby heating and producing the re-evaporation of the water of the steam which had been absorbed into said solution, and so producing the reconcentration of the solution, substantially as herein described.

In testimony whereof I have signed my name to this specification in the presence of two subscribing witnesses.

MORITZ HONIGMANN.

Witnesses:
  PETER HERKMANNS,
  FRANZ BERTRAM.